(12) United States Patent
Wu et al.

(10) Patent No.: US 9,931,577 B2
(45) Date of Patent: Apr. 3, 2018

(54) SERVO OF ENTERTAINMENT ROBOT

(71) Applicant: UBTECH Robotics Corp., Shenzhen (CN)

(72) Inventors: Yumiao Wu, Shenzhen (CN); Youjun Xiong, Shenzhen (CN); Lefeng Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/127,407

(22) PCT Filed: Nov. 24, 2015

(86) PCT No.: PCT/CN2015/000813
§ 371 (c)(1),
(2) Date: Sep. 19, 2016

(87) PCT Pub. No.: WO2017/008181
PCT Pub. Date: Jan. 19, 2017

(65) Prior Publication Data
US 2017/0165585 A1    Jun. 15, 2017

(30) Foreign Application Priority Data

Jul. 15, 2015 (CN) .................... 2015 2 0516530 U

(51) Int. Cl.
*A63H 29/00* (2006.01)
*A63H 33/00* (2006.01)
(Continued)

(52) U.S. Cl.
CPC .............. *A63H 3/36* (2013.01); *A63H 29/00* (2013.01); *A63H 33/042* (2013.01); *A63H 33/084* (2013.01)

(58) Field of Classification Search
CPC ........ A63H 11/00; A63H 29/00; A63H 29/22; A63H 33/042; A63H 33/084; H02K 7/00; H02K 7/06
See application file for complete search history.

(56) References Cited

U.S. PATENT DOCUMENTS

| 5,318,471 A | * | 6/1994 | Glovier | ................... A63H 11/18 |
| | | | | 446/268 |
| 7,567,854 B2 | * | 7/2009 | Desmond | ............... B82Y 10/00 |
| | | | | 700/245 |

(Continued)

FOREIGN PATENT DOCUMENTS

CN     103624788 A    3/2014

OTHER PUBLICATIONS

International Search Report for PCT/CN2015/000813.

*Primary Examiner* — Gene Kim
*Assistant Examiner* — Alyssa Hylinski

(57) ABSTRACT

The present invention discloses a servo of an entertainment robot that includes a servo main body and a servo plate. The servo main body includes a casing and an output shaft. The casing is a hexahedron. The servo plate is fixed to the output shaft of the servo main body. The servo plate includes a square drive plate. At least one surface of the servo main body includes a T slot having an opening at one end. The size of the T slot matches the size of the drive plate of the servo plate. Tools are not needed for assembling/disassembling during the assembling of entertainment robots, thereby reducing the complexity during assembling, lowering the assembly difficulty, simplifying the assembling process, increasing the joy of DIY, and providing more space for the users to bring into play their imaginations.

9 Claims, 7 Drawing Sheets

(51) Int. Cl.
    *A63H 3/36*     (2006.01)
    *A63H 33/04*     (2006.01)
    *A63H 33/08*     (2006.01)

(56) References Cited

U.S. PATENT DOCUMENTS

| | | | |
|---|---|---|---|
| 8,175,747 B2* | 5/2012 | Lee | A63H 11/00 |
| | | | 318/568.11 |
| 2003/0038607 A1* | 2/2003 | Yim | A63H 33/042 |
| | | | 318/568.11 |
| 2010/0210173 A1* | 8/2010 | Maggiore | A63H 33/062 |
| | | | 446/125 |
| 2012/0096973 A1* | 4/2012 | Bicchi | B25J 9/08 |
| | | | 74/490.03 |
| 2016/0361813 A1* | 12/2016 | Fei | B25J 9/08 |
| 2017/0274294 A1* | 9/2017 | Liu | A63H 33/042 |
| 2017/0274295 A1* | 9/2017 | Liu | A63H 33/08 |

* cited by examiner

SERVO OF ENTERTAINMENT ROBOT

BACKGROUND

Field of the Invention

The present invention is directed to entertainment robots, and particularly to a servo of an entertainment robot.

Description of the Related Art

Servos are the smallest joint units of entertainment robots, and are used for modular assembling of entertainment robots.

A Chinese utility model patent with patent number CN201420041119.9 discloses a dual shaft servo structure that includes a top cover, a middle case and a bottom cover that are connected in sequence. A plurality of connection holes are defined in a surface of the top cover for connecting with an upper connection plate of a servo connection component. A plurality of connection holes are defined in a surface of the bottom cover for connecting with a lower connection plate of the servo connection component. The dual shaft servo disclosed by the utility model patent and the servo connection component are fixed together through threaded holes extending through the top cover and the bottom cover. It needs tools for assembly of screws. The operations of assembling robots are complex and not easy to master, thereby weakening the user experience and fun and limiting users to bring into play their imaginations.

SUMMARY

The technical problem to be resolved by the present invention is to provide a servo of an entertainment robot that is ease of assembling and disassembling during assembling entertainment robots.

To resolve the above-mentioned problems, the technical solution of the present invention is: a servo of an entertainment robot includes a servo main body and a servo plate. The servo main body includes a casing and an output shaft. The casing is a hexahedron. The servo plate is fixed to the output shaft of the servo main body and includes a square drive plate. At least one surface of the casing includes a T slot having an opening at one end, and the size of the T slot matches the size of the drive plate of the servo plate.

In the above-mentioned servo of an entertainment robot, the output shaft is located at a top surface of the casing, and three side surfaces of the casing each include the T slot.

In the above-mentioned servo of an entertainment robot, the top surface is rectangular. The output shaft is non-centric along a long axis of the top surface and away from a rear side surface of the casing. The three side surfaces include the rear side surface, a left side surface and a right side surface of the casing.

In the above-mentioned servo of an entertainment robot, each of the left side surface and the right side surface includes two T slots. The two T slots of the left side surface or the right side surface are coaxial and include openings facing opposite directions. Axes of the T slots of the left side surface and the right side surface are perpendicular to an axis of the output shaft.

In the above-mentioned servo of an entertainment robot, an axis of the T slot of the rear side surface is parallel to an axis of the output shaft, and the T slot of the rear surface includes an opening facing upward.

In the above-mentioned servo of au entertainment robot, the T slot includes two elastic positioning protrusions. The elastic positioning protrusions are disposed at an inner side of a narrow slot of the T slot and adjacent to a closed end of the T slot. The servo plate includes a mounting hub connected to the drive plate. The mounting hub includes four positioning grooves, and the four positioning grooves are arranged at symmetrical perpendicular axes of the drive plate. When the servo plate is inserted into the T slot, the elastic positioning protrusions of the T slot are fit into the positioning grooves of the mounting hub.

In the above-mentioned servo of an entertainment robot, a height, a width and a length of the casing are integral multiples of six millimeters.

In the above-mentioned servo of an entertainment robot, three side surfaces of the casing defines many mounting holes.

In the above-mentioned servo of an entertainment robot, a distance between each two adjacent mounting holes is an integral multiple of six millimeters.

It does not need tools to assemble/disassemble the servo of an entertainment robot of the present invention during the assembling of entertainment robots, thereby reducing the complexity during assembling, lowering the assembly difficulty, simplifying the assembling process, increasing the joy of DIY and providing more space for the users to bring into play their imaginations.

BRIEF DESCRIPTION OF THE DRAWINGS

The present invention will be further described in detail in conjunction with the detailed description and the drawings.

DETAILED DESCRIPTION

Figure 1:
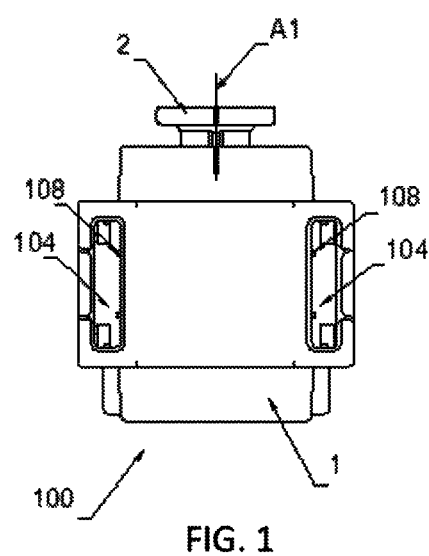
FIG. 1 is a front view of a servo of an entertainment robot of one embodiment of the present invention.
Figure 2:
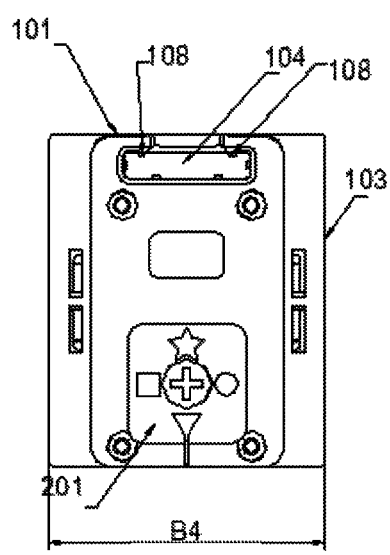
FIG. 2 is a top view of a servo of an entertainment robot of one embodiment of the present invention.
Figure 3:
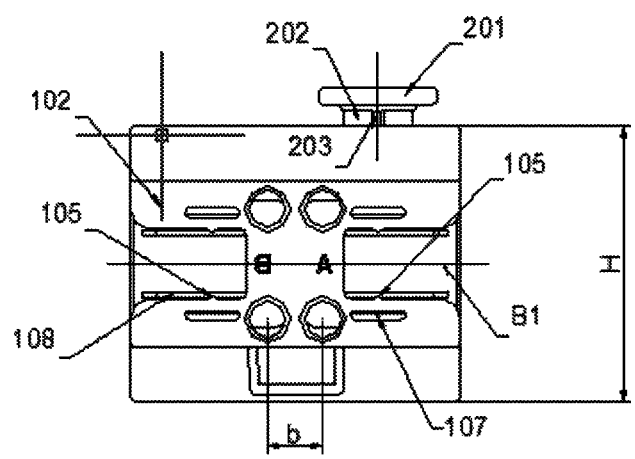
FIG. 3 is a left view of a servo of an entertainment robot of one embodiment of the present invention.
Figure 4:
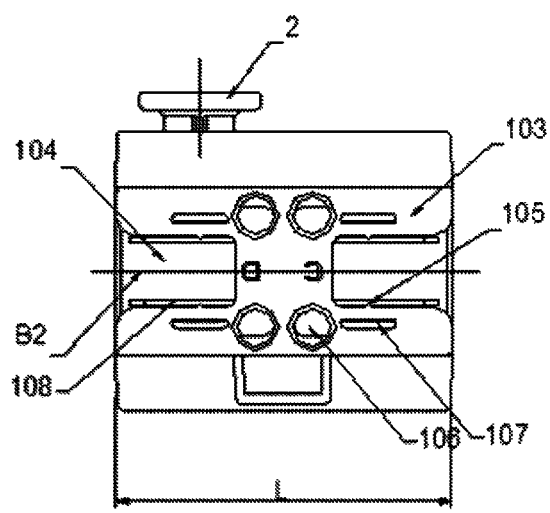
FIG. 4 is a right view of a servo of an entertainment robot of one embodiment of the present invention.
Figure 5:
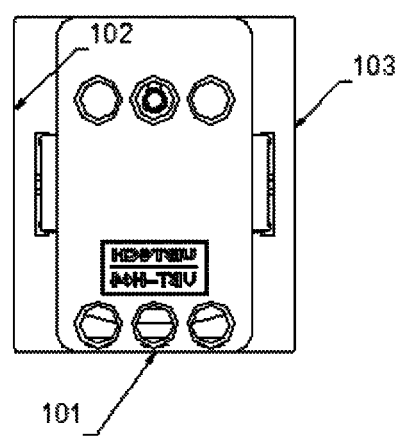
FIG. 5 is a bottom view of a servo of an entertainment robot of one embodiment of the present invention.
Figure 6:
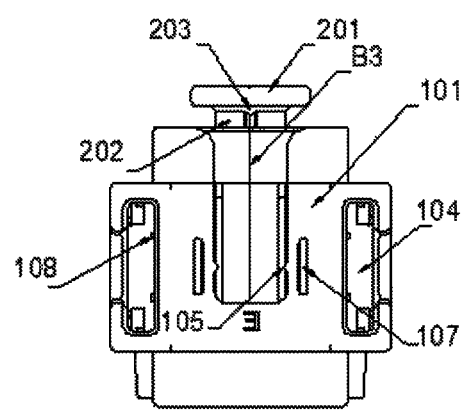
FIG. 6 is a back view of a servo of an entertainment robot of one embodiment of the present invention.
Figure 7:
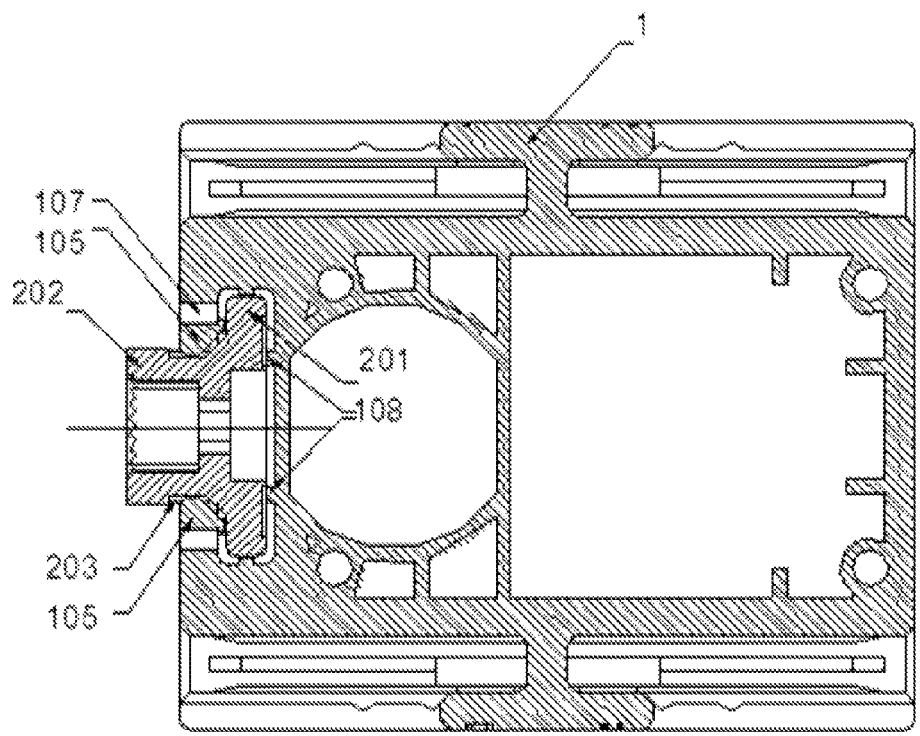
FIG. 7 is a cross-sectional view of a servo plate of an entertainment robot mating with another servo casing in one embodiment of the present invention.

The structure of a servo of an entertainment robot of one embodiment of the present invention is shown in FIGS. 1 through 7, including a servo main body 100 and a servo plate 2. The servo main body 100 includes a casing 1 and an output shaft (not shown). The casing 1 is hexahedron. The servo plate 2 includes a square drive plate 201 having a side length of 13 mm, and a mounting hub 202 connected to the drive plate 201. The servo plate 2 is fixed to the output shaft of the servo main body 100 through the mounting hub 202. Four sides of the drive plate 201 are respectively marked with four symbols Δ, □, ☆, ○ that represent respectively four orientations of the servo plate.

Three side surfaces of the casing 1 define five T slots 104 (A, B, C, D and E) therein, each of which having an opening at one end. Each T slot (slide slot) 104 is 13.7 mm in length and 2.8 mm in width. There are six ribs 108 with a width of 0.7 mm and a height of 0.35 mm at an inner surface of wide slot of each T slot. The ribs have chamfers at an entry. The size of each T slot matches the size of the drive plate 201 of the servo plate 2. The drive plate 201 at any of the four orientations can be slidably mated with the A, B, C, D and E slide slots.

The output shaft of the servo main body 100 is located at the top surface of the casing 1. The top surface is rectangular. The output shaft is non-centric along a long axis of the top surface and away from a rear side surface 101 of the casing 1. The three side surfaces of casing 1 having the T slots 104 are the rear side surface 101, a left side surface 102 and a right side surface 103 of the casing 1.

Each of the left side surface 102 and the right side surface 103 includes two T slots 104. The two T slots 104 of the left side surface 102 are coaxial and includes openings facing opposite directions. The two T slots 104 of the right side surface 103 are coaxial and includes openings facing opposite directions. The axis B1 of the T slots 104 of the left side surface 102 and the axis B2 of the T slots 104 of the right side surface 103 are perpendicular to an axis A1 of the output shaft.

The axis B3 of the T slot 104 of the rear side surface 101 and the axis A1 of the output shaft are parallel to each other. The T slot 104 of the rear side surface includes an opening facing upward.

Each T slot 104 includes two substantially triangular elastic positioning protrusions 105 with a height of about 0.4 mm. The elastic positioning protrusions 105 are opposite and disposed at an inner surface of a narrow slot of the T slot 104 and adjacent to a closed end of the T slot 104. Four triangular positioning grooves 203 having a depth of 0.4 mm are arranged perpendicularly in the mounting hub 202. The four positioning grooves 203 are arranged at symmetrical perpendicular axes of the drive plate 201. The servo plate 2 is insertable into a T slot 104 of another servo or building block according to need. When the servo plate 2 is inserted into one T slot 104 of the another servo, the elastic positioning protrusions 105 of the T slot 104 of the another servo are fit into two opposite positioning grooves 203 of the mounting hub 202 of the servo plate 2, respectively.

Three side surfaces of the casing 1 each define two rows of round mounting holes 106. The round mounting holes 106 are cylindrical holes with a diameter of 4 mm and a height of 3 mm. Steps having a diameter of 5 min and a height of 0.8 min are at opposite ends of the cylindrical holes.

An elongated through hole 107 is defined in an outer side surface of each of the two elastic positioning protrusions 105 of the T slot 104. The plastic thin wall thickness formed between the elongated through holes 107 and the elastic positioning protrusions 105 has a deformation function, which makes the positioning protrusions 105 to be elastic.

The height H, the width B4 and the length L of the casing 1 are integral multiples of 6 mm.

The distance b between each two adjacent mounting holes 106 is an integral multiple of 6 inns.

The aforementioned embodiments of the present invention have the following advantages:

It does not need tools for assembling/disassembling during the assembling of entertainment robots, thereby reducing the complexity during assembling, lowering the assembly difficulty, simplifying the assembling process, increasing the joy of DIY, providing more space for the users to bring into play their imaginations, having a certain level of strength and stability and having a better motion performance.

What is claimed is:

1. A servo of an entertainment robot comprising:
a servo main body comprising a casing and an output shaft, the casing being a hexahedron; and
a servo plate fixed to the output shaft of the servo main body and comprising a square drive plate;
wherein at least one surface of the casing comprises a T slot having an opening at one end, and the size of the T slot matches the size of the drive plate of the servo plate;
wherein the T slot comprises two elastic positioning protrusions, the elastic positioning protrusions are opposite and disposed at an inner side of a narrow slot of the T slot and adjacent to a closed end of the T slot; the servo plate comprises a mounting hub connected to the drive plate, the mounting hub comprises four positioning grooves, the four positioning grooves are disposed at symmetrical perpendicular axes of the drive plate, when the servo plate is inserted into a T slot of another servo, elastic positioning protrusions of the T slot of the another servo are fit into two opposite positioning grooves of the mounting hub.

2. The servo of the entertainment robot of claim 1, wherein the output shaft is located at a top surface of the casing, and three side surfaces of the casing each comprise the T slot.

3. The servo of the entertainment robot of claim 2, wherein the top surface is rectangular, the output shaft is disposed non-centric along a long axis of the top surface and away from a rear side surface of the casing, and the three side surfaces comprise the rear side surface, a left side surface and a right side surface of the casing.

4. The servo of the entertainment robot of claim 3, wherein each of the left side surface and the right side surface comprises two T slots, the two T slots of the left side surface or the right side surface are coaxial and comprise openings facing opposite directions, and axes of the T slots of the left side surface and the right side surface are perpendicular to an axis of the output shaft.

5. The servo of the entertainment robot of claim 1, wherein an axis of the T slot of a rear side surface is parallel to an axis of the output shaft, and the T slot of the rear side surface comprises an opening facing upward.

6. The servo of the entertainment robot of claim 1, wherein a height, a width and a length of the casing are integral multiples of six millimeters.

7. The servo of the entertainment robot of claim 1, wherein three side surfaces of the casing define a plurality of mounting holes.

8. The servo of the entertainment robot of claim 7, wherein a distance between each two adjacent mounting holes is an integral multiple of six millimeters.

9. A servo of an entertainment robot comprising:
a servo main body comprising a casing and an output shaft; and
a servo plate fixed to the output shaft of the servo main body and comprising a drive plate;
wherein a surface of the casing defines a T slot, and the size of the T slot matches the size of the drive plate of the servo plate;
wherein the T slot comprises two elastic positioning protrusions, the elastic positioning protrusions are opposite and formed at an inner side of a narrow slot of the T slot; the servo plate comprises a mounting hub connected to the drive plate, the mounting hub comprises a plurality of positioning grooves, when the servo plate is inserted into a T slot of another servo, elastic positioning protrusions of the T slot of the another servo are fit into two opposite positioning grooves of the mounting hub.

\* \* \* \* \*